United States Patent [19]
O'Dell

[11] Patent Number: 5,819,799
[45] Date of Patent: Oct. 13, 1998

[54] METHOD AND APPARATUS FOR RAPID FLUID DISPENSING

[75] Inventor: Gerald W. O'Dell, Old Lyme, Conn.

[73] Assignee: The Lee Company, Westbrook, Conn.

[21] Appl. No.: 644,900

[22] Filed: May 10, 1996

[51] Int. Cl.⁶ .................................................. F16K 11/074
[52] U.S. Cl. ...................... 137/625.17; 251/118
[58] Field of Search ........................ 137/625.17; 251/120, 251/118; 138/28, 26, 30

[56] References Cited

U.S. PATENT DOCUMENTS

| | | | |
|---|---|---|---|
| 3,061,039 | 10/1962 | Peters | 138/30 |
| 4,759,387 | 7/1988 | Arendt | 138/30 |
| 4,821,777 | 4/1989 | Martin | 138/30 |
| 5,494,076 | 2/1996 | Knapp | 137/625.27 |
| 5,613,520 | 3/1997 | Knapp | 137/625.17 |

FOREIGN PATENT DOCUMENTS

| | | | |
|---|---|---|---|
| 2 480 397 | 2/1983 | France | 137/625.17 |
| 30 00 990 | 12/1980 | Germany | 137/625.17 |
| 24 21 372 | 4/1982 | Germany | 137/625.17 |

*Primary Examiner*—Marguerite McMahon
*Attorney, Agent, or Firm*—Philip J. Lee

[57] ABSTRACT

A method and apparatus for high speed fluid dispensing suitable for ink jet printing comprising the dampening of supply pressure fluctuations during and following operation of the control valve by the incorporation of a resiliently compressible element within the system on the supply side of the valve seat, the element formed of a rubber air bladder placed within the valve chamber, the bladder configured to contract at pressures above the nominal supply pressure and to readily re-expand at pressures below the nominal supply pressure.

23 Claims, 4 Drawing Sheets

METHOD AND APPARATUS FOR RAPID FLUID DISPENSING

BACKGROUND OF THE INVENTION

A. Field of Invention

The present invention relates generally to methods and apparatus for rapid fluid dispensing and more particularly to a new and improved method of, and device for, high speed valve operation suitable for ink jet printing.

B. Description of Related Art

In its simplest form, a drop on demand fluid dispensing system comprises a fluid source connected to a valving means which is in turn connected to an orifice from which the fluid is dispensed. A simple valve having only open or shut positions may be operated as a dispensing or metering means by opening the valve for short, discrete periods to allow the dispensing of a predictable amount of fluid as desired. The precision of the metering function depends upon the size of the volume of fluid that flows through the valve in one cycle of valve operation. In many processes it is desirable to dispense small volumes per valve cycle, while achieving a rapidly repeatable valve cycle. For example, in the process of ink jet printing, it is necessary to accurately control the deposition of ink on a moving substrate. Ink jet printing is commonly achieved by the dispensing of ink by discrete drops. A commonly employed means of providing the force required to impel a drop of ink involves the pressurization of the ink source. The control valve is electronically controlled to open and close as desired to create timed expulsion of ink drops required for printing. In one operating cycle, the control valve opens momentarily to allow enough ink through the system to create an ink drop at the orifice and closes to limit the size of the drop. The momentary operation of the control valve causes a pressure wave to travel toward the orifice to expel an ink drop from the orifice.

In practice, the substrate is commonly transported past a bank of multiple orifices arrayed in a print head and the corresponding multiple valves are sequenced to dispense drops of ink in the desired pattern. The print resolution achievable by an ink jet printing system is generally dependent upon the size of the ink drops and the number of orifices in the printhead. The speed at which the substrate passes through the system is limited by the frequency at which the ink drops are expelled. For uniform and predictable printing results, the size of the ink drops must be uniform and the velocity of the ink drops, ie., the force of expulsion must also be the same from one drop to the next. In addition, for each ink drop to create a discrete mark, the entire volume of ink dispensed must travel at relatively uniform internal velocity. A critical cycle upon which the speed of the printing operation depends, is the time it takes for a valve to dispense a drop of ink and return to a state where the next drop of ink can be dispensed such that each ink drop dispensed is equal. It is also notable that due to the size restraints imposed by the fact that print resolution is dependent upon the density of the orifices in the printhead, it is generally desirable that control valves, ports, and connecting tubing should be as small as possible.

It has been found to be difficult to perform ink jet printing at substrate speeds higher than approximately 100 feet per minute, a speed at which the valve must operate at a frequency of about 240 Hertz. Although fluid control valves have been available with a physical operating speed higher than 240 Hertz, efforts to incorporate such high speed valves in ink jet printing have not generally resulted in significantly increasing substrate speeds without unacceptable degradation of print quality. One hypothesis of the nature of the problem and solution is shown in U.S. Pat. No. 5,610,401 to Shrivastava which teaches the selection of the flexible tubing between the valve and the orifice according to characteristics calculated in order to insure an increase in the resonant frequency of the system to at least 3 to 6 times higher than the highest frequency of the operation of the valve. Since the operation of systems at resonant frequencies at or above those taught by the Shrivastava patent are believed to be commonly in use and have been in use for some time prior to the Shrivastava patent, it is not understood how the teaching of the Shrivastava improves the practice of ink jet printing. In particular, other than as an application of the general engineering principle that systems may become erratic if operated close to the natural resonant frequency, it is uncertain how simply increasing the resonant frequency of the system improves high speed printing. The size reductions prompted by desire for higher print resolution already constitute changes that increase the resonant frequency of the system; however, printing systems having resonant frequencies in excess of three times the operating frequency continue to exhibit erratic drop size. While the problem of erratic drop size, shape and internal velocity is critical and apparent in ink jet printing, particularly at high speed operation, these problems may occur in, and similarly detract from the accuracy of, other systems where discrete, small volumes of fluid are dispensed under supply side pressure.

It has been discovered that the operation of a typical dispensing valve, suitable for ink jet printing, involving the use of a solenoid plunger to open and close a outlet port, creates oscillations in the supply pressure of the fluid media in the system proximate to the valve. FIG. 4A shows a pressure trace measured at the inlet to the supply side of the valve chamber of a conventional control valve when the solenoid is energized commencing at time 0 and continuing for one millisecond. In accord with common usage, the nominal supply pressure is described herein and shown in FIGS. 4A and 4B as measured in pressure units above atmospheric pressure. Additionally, for the sake of clarity, the pressure traces shown in both FIGS. 4A and 4B were modified by the elimination of fluctuations of small amplitude and high frequency, smoothing the trace to show the most relevant deviations from nominal pressure. The pressure oscillations occur while the valve is open and continue after the valve has returned to a state at which a subsequent operation of the valve could occur otherwise. As shown in FIG. 4A, experimentation with a typical dispensing valve and a supply pressure of 5 p.s.i. (pounds per square inch) has shown significant supply pressure fluctuations to persist for up to 4 msec. Under these conditions, the pressure fluctuations persist throughout the entire period of the operating cycle of the valve at 250 Hertz. Accordingly, it is believed that at operating frequencies over 250 Hertz, the valve would physically cycle while the fluctuations in pressure persisted, causing the valve to operate under unpredictably varying source pressures. It is believed that the variation in supply pressure causes or contributes to erratic dispensing, and to erratic ink drop formation in ink jet printing. It is understood that the small internal sizes of the flow path elements in such systems may contribute to the pressure oscillations; however miniaturization being generally desirable, the need remains for a method of dispensing small discrete and uniform amounts of fluid, as in ink jet printing, which can operate at higher frequencies without suffering a variation in the size or velocity of ink drops, or other fluid being dispensed.

SUMMARY OF THE INVENTION

The present invention comprises an improved method of, and device for, fluid dispensing suitable for ink jet printing using an adaptation of an otherwise conventional high speed control valve. The method comprises shortening the amplitude and persistence of supply pressure fluctuations during the operation of, and following the closing of the control valve to allow the shortening of the period between valve openings while ensuring that each valve opening occurs at a uniform supply pressure and to maintain a stable supply pressure during the operation of the valve. To reduce the variations in pressure, the method of the present invention includes the dampening of the pressure fluctuation by the incorporation of a resiliently compressible element within the system on the supply side of the valve seat. The device of the present invention comprises a control valve that has been adapted according to the method by the incorporation of a compressible element on the supply side of the valve seat. The inclusion of the compressible element reduces the effective bulk modulus of elasticity of the fluid system and thereby reduces the natural resonance of the fluid system as well as the resonance is directly related to the square root of the bulk modulus of the fluid system. To control the local pressure fluctuations with greatest efficiency, the compressible element is located as proximate to the valve seat as reasonably possible. In a typical dispensing valve having a generally cylindrical valve chamber and a centrally located valve seat surrounding the outlet port, the method preferably involves placement of a bladder within the valve chamber. The bladder is configured to be readily and resiliently compressible so as to contract at pressures above the nominal supply pressure and to readily expand at pressures below the nominal supply pressure in order to dampen the variations in fluid pressure caused by the operation of the valve. In this way, the speed of at which the valve can accurately dispenses a discrete amount of fluid is increased by the method of lowering the effective bulk modulus of the fluid system. The present invention does not require an increase in fluid volume within the system. The preferred embodiment of a bladder in accord with the method of the present invention consists of a generally annular hollow rubber bladder formed by the sealing of the ends of a length of rubber tubing. In a preferred embodiment of the present invention, the fluid to be dispensed is liquid at a supply pressure above atmospheric pressure, and the bladder is filled with a gas, namely, air at atmospheric pressure. The bladder is placed along the outer wall of the valve chamber surrounding the outlet port and valve seat, sufficiently distant to prevent flow blockage and to prevent interference with the operation of the valve head and plunger. The compression and expansion of the bladder in response to variations in supply pressure appears to eliminate the majority of pressure variations and allows the system to return to a stable nominal pressure within a minimum time period. FIG. 4B shows a pressure trace measured as close as possible to the supply side of the valve chamber of a conventional control valve that has been adapted by the inclusion of a bladder in accord with the present invention, when the solenoid is energized commencing at time 0 and continuing for one millisecond, at a nominal supply pressure of 5 p.s.i. As shown in FIG. 4B, the result of the inclusion of the compressible element is to reduce the pressure fluctuations to a slight, gradual dip in pressure of short duration. Shortening the period of pressure variation shortens the minimum period of the valve's operational cycle that can be achieved while ensuring that, for each cycle, the valve is operating at the same supply pressure. It is believed that the fluid pressure at the vicinity of the valve seat significantly affects the intensity of the pressure surge generated by the disengagement and re-engagement of the valve head with the valve seat, and which, at the orifice, controls the formation and expulsion of the ink drop. In this manner, utilization of the method of the present invention by inclusion of a valve with resiliently compressible element allows the printing system to be operated at higher speeds with improved print results. In other systems, the method and device of the present invention allows a dispensing valve to be operated at higher speeds without sacrificing precision in the fluid output. The relatively uniform supply pressure during the entire valve cycle is believed to benefit concise ink drop formation in slower speed printing as well. An additional benefit of the present invention is that an existing ink jet printing system can be converted to employ the method of the present invention by insertion of suitable bladders in existing valves that can be so adapted or, if the existing valves are not adaptable, by the replacement of the existing valves with valves in accord with the present invention.

The principal aim of the present invention is to provide a new and improved method and device for dispensing small volumes of fluid which meets the foregoing requirements and which is capable of consistent, accurate operation at operating frequencies above 250 Hertz.

Another and further object and aim of the present invention is to provide a new and improved method and device which meets the foregoing requirements and which is suitable for ink jet printing at operating frequencies above 250 Hertz with acceptable print quality.

Another and further object and aim of the present invention is to provide a new and improved method and device for fluid dispensing or ink jet printing which is economical to manufacture, maintain and operate.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(s)

Figure 1:
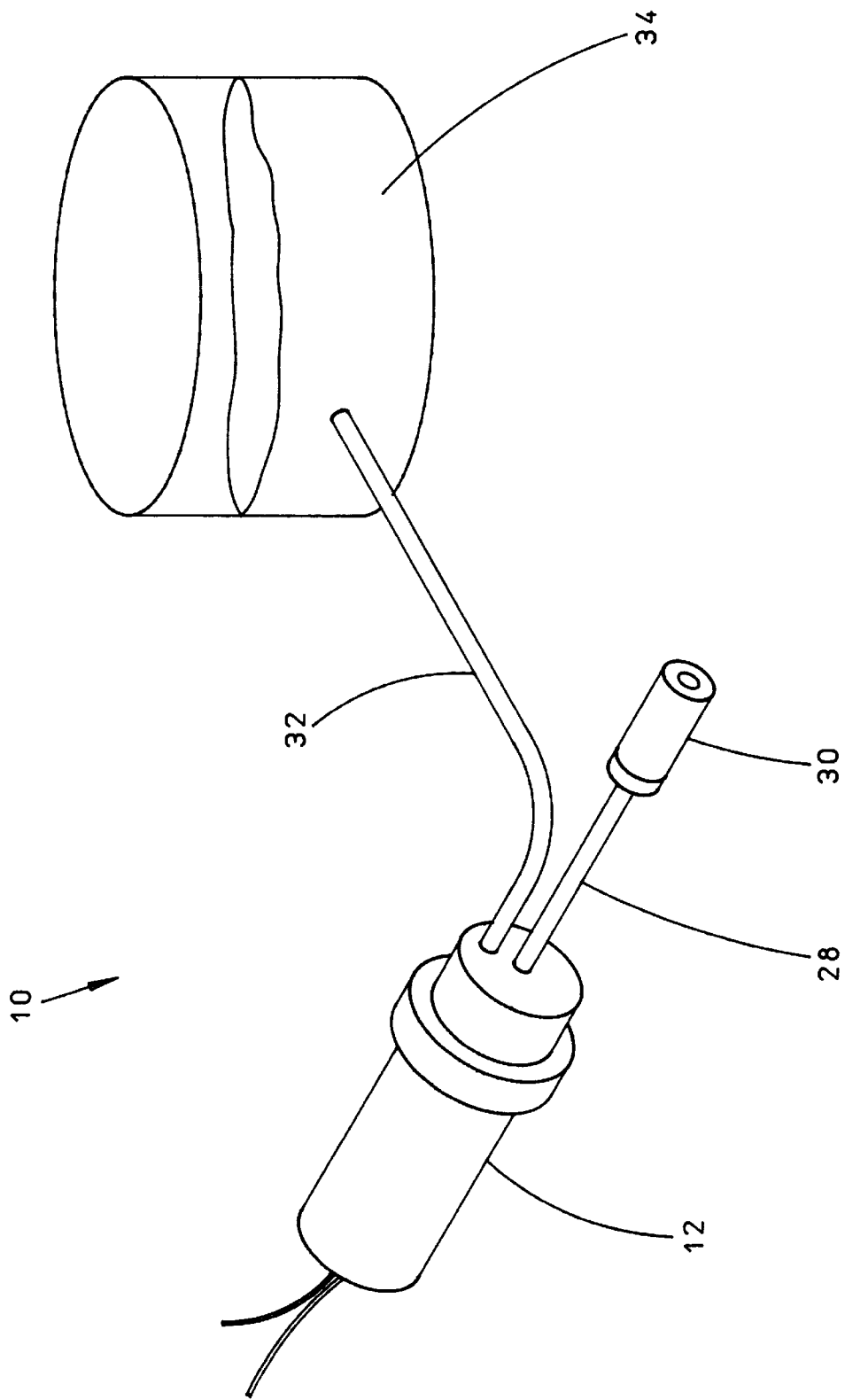
FIG. 1 is a plan view of a part of an ink jet printing apparatus in accord with the present invention showing a subsystem consisting of an orifice, a control valve, an ink supply and tubing connecting said elements.
Figure 2:
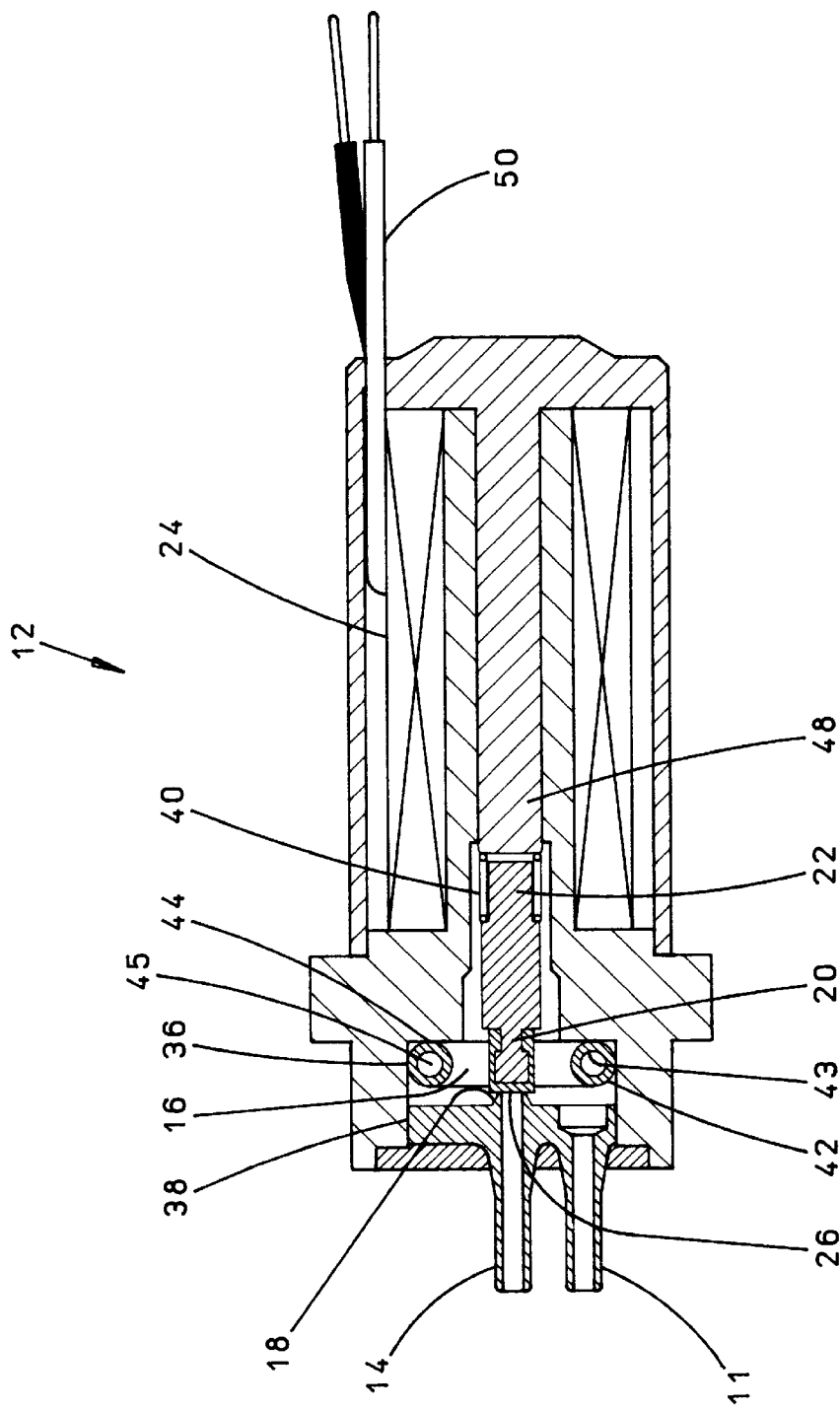
FIG. 2 is a longitudinal section view of a preferred embodiment of an unenergized dispensing valve constructed in accord with the present invention.
Figure 3:
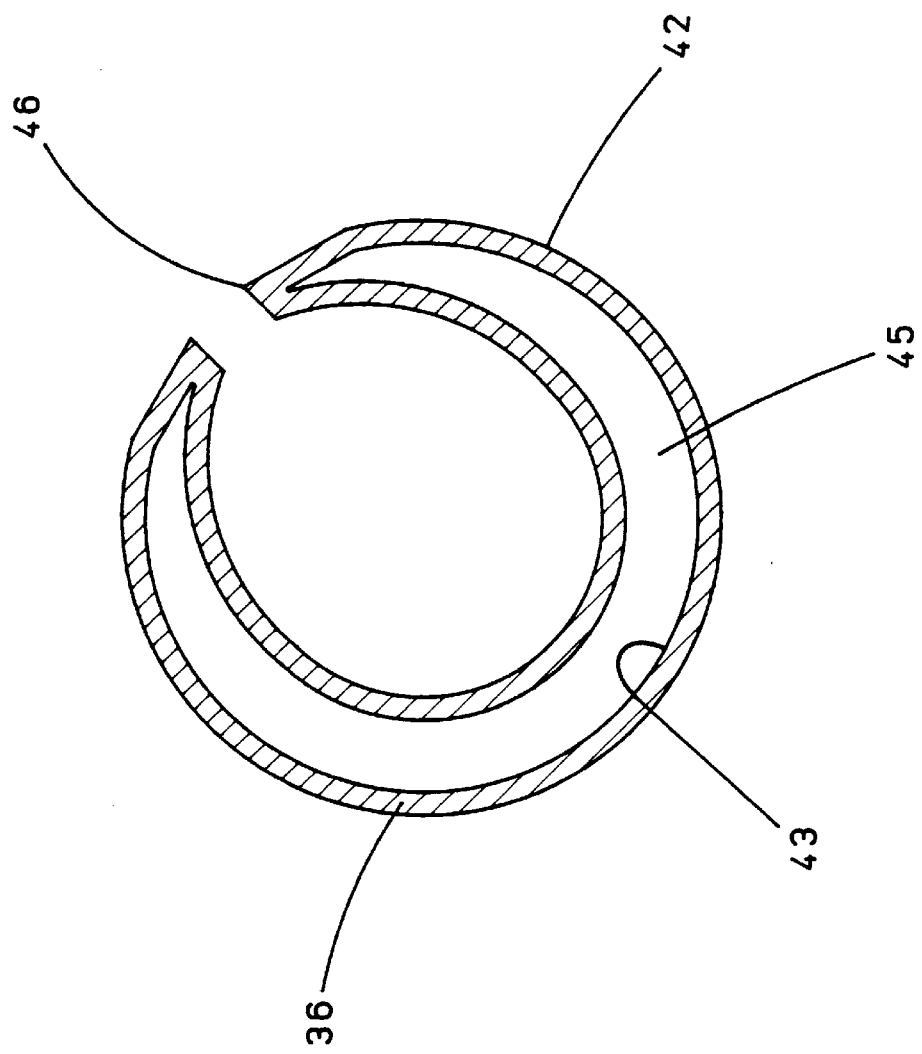
FIG. 3 is a sectional view of a preferred embodiment of an compressible element in accord with the present invention.
Figure 4B:
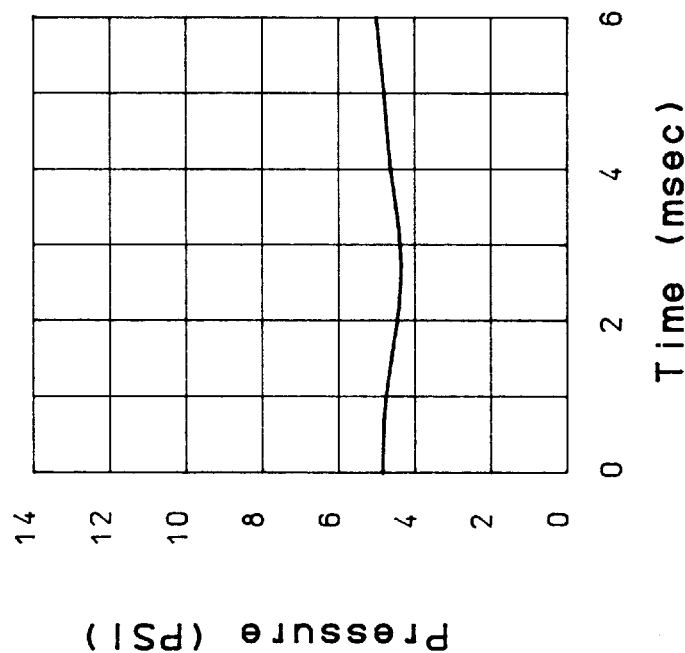
FIG. 4B is a graph of the supply pressure fluctuations detected in a test system including a valve adapted in accord with the present invention at a nominal supply pressure of 5 p.s.i.
Figure 4A:
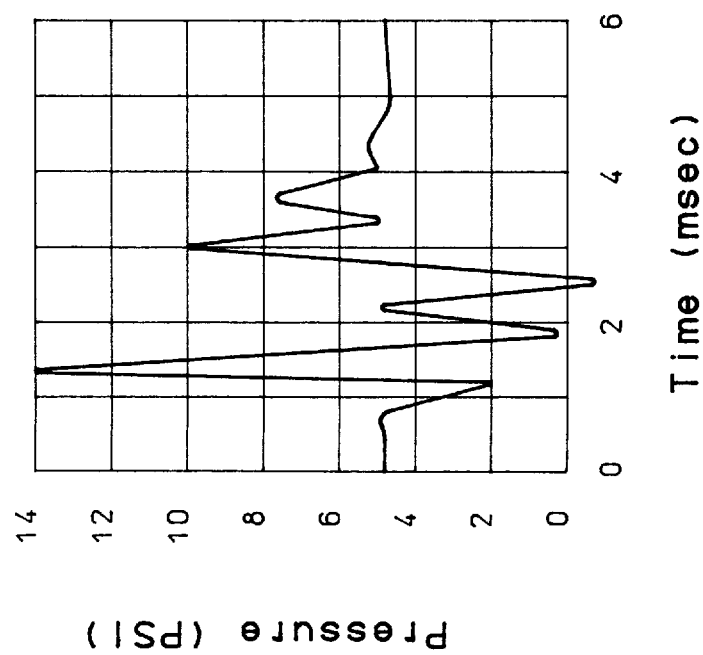
FIG. 4A is a graph of the supply pressure fluctuations detected in a test system including a conventional valve, not adapted in accord with the present invention at a nominal supply pressure of 5 p.s.i.

With reference to the Drawings wherein like numerals represent like parts throughout the Figures, an ink jet printing unit for ink jet printing in accordance with the method of the present invention is generally designated by numeral 10 in FIG. 1.

The present invention comprises an improved method of fluid dispensing as for example in ink jet printing by dampening fluctuations in the pressure of the fluid supply and the apparatus for practicing the method. The preferred embodiment of the method comprises an adaptation of a fluid control valve 12 having an inlet port 11 and an outlet port 14, both of which are in fluid communication with a valve chamber 16. A valve seat 18 surrounds the entrance of outlet port 14 to valve chamber 16. A plunger 20 is mounted on an armature 22 that is slidably received within a solenoid coil 24 such that a valve head 26 at the end of plunger 20 retractably engages valve seat 18 to control the flow of the fluid media out of valve 12 through outlet port 14. Valve chamber 16 is generally cylindrical and is coaxial at one end with the valve seat 18 and at the other end is coaxial with the valve head 26 and plunger 20. A spring 40 urges plunger 20 toward valve seat 18 and armature 22 is positioned within the solenoid coil 24 such that the energizing of solenoid coil 24 retracts armature 22 against the force of spring 40, pulling valve head 26 away from valve seat 18, toward and up to a plunger stop 48. Outlet port 14 is connected to an orifice 30 by means of a length of tubing 28. In a complete ink jet printing system, a multitude of similar orifices in addition to orifice 30 would typically be compactly arrayed in a print head (not shown). Inlet port 11 is connected to a ink supply manifold 34 by a length of tubing 32. In a complete ink jet printing system, all or a multitude of inlet port supply tubes similar to tube 32 would typically be connected to a common manifold. In the preferred embodiment, the outlet port 14, valve seat 18, valve head 26, plunger 20, and the housing 38 which forms the valve chamber 16 are generally symmetrical about the same central axis, the exceptions being the wiring connections 50 to the coil 24 and the position of inlet port 11 which is parallel to outlet port 14 and located between outlet port 14 and the outer wall 44 of valve chamber 16.

The preferred embodiment of the present invention comprises the inclusion of a bladder 36 within the valve chamber 16. Bladder 36 is a compressible element capable of absorbing pressure fluctuations by compressing in response to supply pressure increases and expanding when the supply pressure decreases. In the preferred embodiment, bladder 36 is designed for use with a nominal supply pressure of about 5 p.s.i., and is formed of an elastomeric material with an inner wall 43 defining a bladder chamber 45 that is filled with ordinary air at atmospheric pressure before being pressurized by the fluid media within the system. Bladder 36 is formed by the curling of a length of rubber tubing which is then crimped and cut to the desired length with the ends 46 being sealed. Bladder 36 is curled to a radius at least slightly greater than the radius of the valve chamber 16, and when inserted into valve chamber 16, bladder 36 is slightly bent inwardly to assume the curvature of valve chamber 16. The elastic nature of the material of bladder 36 causes the outer surface 42 of bladder 36 to be forced against the housing 38 which forms the wall of valve chamber 16, helping to retain bladder 36 in position. In the illustrated preferred embodiment, the outside diameter of bladder 36 and inside diameter of valve chamber 16 are both about 0.323 inches, the cut length of bladder 36 is about 0.83 inches, the inside diameter of bladder chamber 45, at atmosphere, is about 0.04 inches and the wall thickness of bladder 36 is about 0.012 inches. Bladder 36 is preferably formed of ethylene propylene rubber (commonly referred to as "EPDM"); however, other suitable substances may perform equivalently, or be required in particular circumstances, including use with different fluids or supply pressures. The inside diameters of the inlet port 11 and the outlet port 14 are about 0.03 inches; however, in the preferred embodiment it was found that the valve seat was preferably reduced to a diameter of about 0.015 inches. In the illustrated preferred embodiment, the volume of valve chamber 16 has been calculated to be 0.00770 cubic inches and the volume of bladder chamber 45 has been calculated to be 0.00101 cubic inches.

It should be appreciated and anticipated that the dimensions given for the preferred embodiment are examples of an exemplary working system and are not meant to be the only dimensions by which the method of the present invention may be practiced. For example, the above specified internal volume of bladder chamber 45 is required to sufficiently reduce the amplitude and duration of pressure fluctuations by reducing the effective bulk modulus of the fluid system of the specified valve. For the sake of simplicity, the effective bulk modulus of bladder 36 is considered to be roughly equivalent to the bulk modulus of the air within bladder chamber 45 on the assumption that the walls of bladder 36 are not so stiff as to significantly resist the compression of the air nor so compressible as to require separate consideration. The bulk moduli of fluid systems generally will vary according to a number of factors, generally including the volume, internal geometry, containment and type of fluid and the characteristics of the compressible element must be varied from those of bladder 36 to achieve equivalent results in other systems. Given similar materials such that the air within bladder chamber 45 absorbs the most significant part of the required compression, the internal volume of bladder chamber 45 must be large enough to accommodate such variations to perform the desired damping function. It is understood that the ratio of the internal volume of bladder chamber 45 to the size of valve chamber 16 is a determinant of the damping effect of bladder 36. Using the method and device of the present invention in an ink jet printing application, it has been found that inclusion of bladder 36 reduces the duration and amplitude of the ink supply pressure fluctuations enough to significantly increase the frequency at which the control valve may be operated without experiencing unacceptably erratic ink drop formation.

The following explanation uses the dimensions and affect of the preferred embodiment as an example to illustrate the method of the present invention in general to allow its use in other applications. Assuming the Bulk Modulus ($B_1$) of the fluid (ink) to be approximately $3.1 \times 10^5$ and that the Bulk Modulus ($B_b$) of the air in the bladder chamber 45, at a supply pressure of 5 p.s.i. is approximately 19.7 p.s.i. (atmosphere plus 5 p.s.i.), the difference between the $B_1$ and $B_b$ is so great that for the sake of simple approximation, the contribution of $B_1$ to the Bulk Modulus of the system ($B_s$) may be ignored. Thus, if the effect of the elasticity of the material of the walls of bladder 36 is also ignored, the formula for approximating $B_s$ may be stated as $B_s = PV_s/V_b$ where:

P=the pressure of the gas within bladder 36;

$V_s$=the volume of the valve chamber 16; and $V_b$=the volume of bladder chamber 45.

Pressure fluctuations are considered to be proportional to the square root of the bulk modulus of the fluid system involved. Therefore, the damping of the fluctuations may be expressed as the percent of the fluctuation expected with damping to that expected without bladder 36; ie. the fluctuation of the damped system is approximated by the square root of ratio of the bulk modulus of the fluid system including bladder 36 to the bulk modulus of the fluid system without bladder 36. Using the values of 0.00101 square inches for the volume of bladder chamber 45 and 0.0077 square inches for the volume of valve chamber 16, the foregoing formula yields $B_s$=150 p.s.i. Therefore, the damping achieved by the described embodiment of the present invention reduces fluctuations to about 2.2%, representing the square root of the product of 150 divided by $3.1 \times 10^5$. According to the above formula, the approximate ratio of the volume of valve chamber 16 to the volume of bladder chamber 45 required to achieve the 97.8% reduction of supply pressure fluctuation, at nominal supply pressure of 5 p.s.i. is 7.6. Stated otherwise, the internal volume of bladder chamber 45 needs to be 1/7.6th, or about 13%, of the volume of valve chamber 16 to achieve the desired reduction in supply pressure fluctuation. The foregoing can be used to design compressible elements such as bladder 36 to achieve other levels of damping, or for use in other sized valves. Standard formulae may be employed in specific applications to determine the appropriate internal volumes of bladder chamber 45 and valve chamber 16, or the equivalent of these elements in other systems. Other levels of damping can be achieved by determining the desired damping percent, and from that, the desired bulk modulus of the fluid system and then using the foregoing formula to predict the volume of the compressible element to be added to the system.

Additionally, variations in the material and thickness of the walls of bladder 36 will be consistent with the method of the present invention if the compressibility and elasticity of bladder 36 remain such that bladder 36 is enabled to contract and re-expand in response to anticipated variations in the supply pressure. While bladder 36 in the illustrated preferred embodiment is formed of EPDM rubber, a variety of materials could be used with satisfactory, or similar results, provided such other materials were sufficiently compatible with the fluid to be dispensed, and that the overall compressibility of bladder 36 is maintained. For guidance in selection of other materials, it is noted that the EPDM rubber of bladder 36 has a durometer of about Shore A 50 and is available from and sold by the following companies under the respective trademarks: Nordel, E.I. duPont de Nemours Co.; Royalene, Uniroyal; Vistalon, Exxon Chemical Co. USA; Epsyn, Copolymer Rubber & Chemical Corp.; and Epcar, B. F. Goodrich Co. It is anticipated that the wall of bladder 36 may be made thicker with a material that is more pliable, or made thinner with a material that is stiffer with similar results. Changes in the characteristics will not vary the volume requirement, unless the resilience of the bladder wall significantly alters the bulk modulus of bladder 36, as calculated based upon the volume of bladder chamber 45 alone, in which case, it may be necessary to calculate the effective bulk modulus of bladder 36 according to conventional formulae. It is further noted that the pressure of the gas within bladder 36 could be varied to adjust the compressibility of bladder 36 as required to maintain the desired performance if the nominal supply pressure is varied, or if it is desirable to vary the size of bladder 36.

Further, it is anticipated that other structures may be designed that configure a compressible element in a form other than the illustrated bladder 36 without departing from the method of the present invention. Anticipated variations of the compressible element include using an elastic membrane and/or housing structure to entrap a volume of gas proximate to the valve seat 18, significantly increasing the diameter of the ink supply line, or increasing the volume of the valve chamber 16.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention. Additionally, other useful applications of the supply pressure dampening method may exist in other processes involving rapid repeat valving where fluid must be accurately and uniformly dispensed through the valve.

What is claimed is:

1. A method of high speed fluid dispensing comprising the dispensing of small distinct droplets of fluid having relatively uniform volume by means of a valve having a valve seat, a valve chamber proximate to the valve seat, and a plunger releasibly engageable with the valve seat, the method comprising controlling variations in the pressure of the fluid within the valve chamber caused by operation of the plunger by including within the valve chamber an annular, gas filled bladder having at least one flexible surface exposed to the fluid in the valve chamber, and placing the bladder in close proximity to, and surrounding the valve seat.

2. The method of claim 1, wherein the flexible surface of the bladder is formed of an elastomeric substance.

3. The method of claim 2, wherein the bladder is essentially toroidal in shape.

4. The method of claim 3, wherein the valve is operated in excess of 250 hertz.

5. The method of claim 4, wherein the internal volume of the bladder is approximately 13 percent of the internal volume of the valve chamber and the fluid is supplied at approximately 5 pounds of pressure per square inch.

6. The method of claim 2, wherein the desired level of fluid pressure fluctuations is achieved by sizing the internal volume of the bladder such that the square root of the bulk modulus of the fluid system approximates the desired level of fluid pressure fluctuation.

7. The method of claim 6, wherein the internal volume of the bladder is approximately 13 percent of the internal volume of the valve chamber and the fluid is supplied at approximately 5 pounds of pressure per square inch.

8. The method of claim 7, wherein the bladder is essentially toroidal in shape and formed of an elastomeric substance.

9. The method of claim 8, wherein the valve is operated in excess of 250 hertz.

10. A method of high speed ink jet printing comprising the method of dispensing of small distinct droplets of ink having relatively uniform volume by means of a valve having a valve seat, a valve chamber proximate to the valve seat, and a plunger releasibly engageable with the valve seat, the method comprising controlling variations in the pressure of the ink within the valve chamber caused by operation of the plunger by including within the valve chamber an annular, gas filled bladder having at least one flexible surface exposed to the ink in the valve chamber, and placing the bladder in close proximity to, and surrounding the valve seat.

11. The method of claim 10, wherein the flexible surface of the bladder is formed of an elastomeric substance.

12. The method of claim 11, wherein the bladder is hollow and essentially toroidal in shape.

13. The method of claim 12, wherein the valve is operated in excess of 250 hertz.

14. The method of claim 13, wherein the internal volume of the bladder is approximately 13 percent of the internal volume of the valve chamber and the fluid is supplied at approximately 5 pounds of pressure per square inch.

15. The method of claim 10, wherein the desired level of fluid pressure fluctuations is achieved by sizing the internal volume of the bladder such that the square root of the bulk modulus of the fluid system approximates the desired level of fluid pressure fluctuation.

16. The method of claim 15, wherein the valve is operated in excess of 250 hertz.

17. The method of claim 16, wherein the internal volume of the bladder is approximately 13 percent of the internal volume of the valve chamber and the fluid is supplied at approximately 5 pounds of pressure per square inch.

18. An apparatus for high speed fluid dispensing of small distinct droplets of fluid having relatively uniform volume comprising a valve having a valve seat, a valve chamber, and a plunger releasibly engageable with the valve seat, further comprising an annular, gas filled bladder having at least one flexible surface exposed to the fluid in the valve chamber and placed in close proximity to, and surrounding the valve seat.

19. The apparatus of claim 18, wherein the flexible surface of the bladder of the bladder is formed of an elastomeric substance.

20. The apparatus of claim 19, wherein the bladder is hollow and essentially toroidal in shape.

21. The apparatus of claim 20, wherein the valve is capable of being operated in excess of 250 hertz.

22. The apparatus of claim 21, wherein the internal volume of the bladder is approximately 13 percent of the internal volume of the valve chamber.

23. An apparatus for high speed ink jet printing comprising a valve, capable of being operated in excess of 250 hertz, having a valve seat, a valve chamber, and a plunger releasibly engageable with the valve seat, further comprising an annular, toroidally shaped, gas filled bladder with an internal volume, approximately 13 percent of the internal volume of the valve chamber and formed of an elastomeric substance exposed to the ink in the valve chamber and placed in close proximity to, and surrounding the valve seat.

* * * * *